United States Patent
Chapman et al.

(10) Patent No.: US 12,045,292 B2
(45) Date of Patent: *Jul. 23, 2024

(54) METHOD, APPARATUS, AND COMPUTER PROGRAM PRODUCT FOR PREDICTIVE DYNAMIC BIDDING RULE GENERATION FOR DIGITAL CONTENT OBJECTS

(71) Applicant: ByteDance Inc., Wilmington, DE (US)

(72) Inventors: Clovis Aurius Chapman, Seattle, WA (US); Owen Buehler, San Francisco, CA (US); Mazeiar Salehie, Bellevue, WA (US)

(73) Assignee: ByteDance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,898

(22) Filed: Feb. 6, 2023

(65) Prior Publication Data

US 2023/0259559 A1 Aug. 17, 2023

Related U.S. Application Data

(63) Continuation of application No. 16/396,228, filed on Apr. 26, 2019, now Pat. No. 11,604,836.

(60) Provisional application No. 62/663,882, filed on Apr. 27, 2018.

(51) Int. Cl.
*G06F 16/00* (2019.01)
*G06F 16/9032* (2019.01)
*G06F 16/906* (2019.01)
*G06N 20/20* (2019.01)
*G06Q 30/08* (2012.01)

(52) U.S. Cl.
CPC ........ *G06F 16/906* (2019.01); *G06F 16/9032* (2019.01); *G06N 20/20* (2019.01); *G06Q 30/08* (2013.01)

(58) Field of Classification Search
CPC .......................... G06F 16/906; G06F 16/9032
See application file for complete search history.

(56) References Cited

U.S. PATENT DOCUMENTS

| | | | | |
|---|---|---|---|---|
| 2013/0018722 | A1* | 1/2013 | Libby | G06Q 30/0241 705/14.46 |
| 2013/0311271 | A1* | 11/2013 | Agrawal | G06Q 30/02 705/14.71 |
| 2016/0155147 | A1* | 6/2016 | Dunham | G06Q 30/0241 705/14.54 |
| 2017/0262899 | A1* | 9/2017 | Geraghty | G06Q 30/0277 |
| 2018/0300768 | A1* | 10/2018 | Samet | G06Q 30/0244 |
| 2019/0303980 | A1* | 10/2019 | Yan | G06Q 30/0275 |

* cited by examiner

*Primary Examiner* — Khanh B Pham
(74) *Attorney, Agent, or Firm* — ALSTON & BIRD LLP (57) ABSTRACT

Embodiments of the present disclosure provide methods, systems, apparatuses, and computer program products for predictive dynamic bidding rules generation for digital content objects.

20 Claims, 6 Drawing Sheets

METHOD, APPARATUS, AND COMPUTER PROGRAM PRODUCT FOR PREDICTIVE DYNAMIC BIDDING RULE GENERATION FOR DIGITAL CONTENT OBJECTS

CROSS-REFERENCE TO RELATED APPLICATIONS

This application is a continuation of U.S. application Ser. No. 16/396,228, titled "METHOD, APPARATUS, AND COMPUTER PROGRAM PRODUCT FOR PREDICTIVE DYNAMIC BIDDING RULE GENERATION FOR DIGITAL CONTENT OBJECTS, filed Apr. 26, 2019, which application claims priority to U.S. Provisional Application No. 62/663,882, titled "METHOD, APPARATUS, AND COMPUTER PROGRAM PRODUCT FOR PREDICTIVE DYNAMIC BIDDING RULE GENERATION FOR DIGITAL CONTENT OBJECTS," filed Apr. 27, 2018, the contents of which are incorporated herein by reference in their entirety.

BACKGROUND

Client devices submit search queries and may interact with digital content returned as part of the search results, where the digital content is associated with one or more digital content objects (e.g., keywords). Generating an electronic bid value for any given digital content object (e.g., keyword) so as to increase interaction by any client device with the digital content associated therewith is a difficult and dynamically changing computational challenge. Through applied effort, ingenuity, and innovation, many of these identified problems have been solved by developing solutions that are included in embodiments of the present disclosure, many examples of which are described in detail herein.

BRIEF SUMMARY

This specification relates to predictively and dynamically generating bidding rules for digital content objects. In one embodiment, a computing entity or apparatus is configured to retrieve a plurality of device rendered object data structures from a plurality of data streams. In embodiments, each data stream retrieved from one of a plurality of data sources.

In embodiments, for each device rendered object data structure of the plurality of device rendered object data structures one or more digital content objects contained in the device rendered object data structure is extracted.

In embodiments, for each associated digital content object, one or more device rendered object attributes, one or more device rendered object interaction currency value, and one or more device rendered object interaction timestamps are extracted.

In embodiments, one or more of the device rendered object attributes, device rendered object interaction currency values, and one or more device rendered object timestamps are appended to a digital content object data structure associated with the digital content object.

In embodiments, a machine learning model is used to define a plurality of digital content object clusters. In embodiments, each digital content object cluster is defined based upon similarities identified by the machine learning model.

In embodiments, upon determining that an average digital content object interaction currency value associated with a digital content object cluster exceeds an average digital content object interaction currency value associated with a digital content object superset, an electronic bid adjustment rule is generated to be applied to each existing electronic bid value for each digital content object of the digital content object cluster.

In embodiments, the existing electronic bid value for each digital content object of the digital content object cluster is adjusted based on the electronic bid adjustment rule.

In embodiments, the plurality of data sources comprises one or more of a device rendered object attributes repository, a device rendered object transactions repository, and a digital content object interaction repository.

In embodiments, the average digital content object interaction currency value is calculated based upon historical digital content object interaction currency values associated with each digital content object of the related digital content object cluster.

In embodiments, a digital content object is a keyword.

In embodiments, the plurality of digital content object clusters is continuously updated based on data streams received in real-time.

In embodiments, the machine learning model is based on one of a classification algorithm, a clustering algorithm, or a decision tree.

In embodiments, the electronic bid value is for transmitting to a third party content provider for use in an electronic digital content auction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to predictively and dynamically generating a bidding rule for a digital content object. For example, the methods, apparatus and computer program products described herein are operable to retrieve a plurality of device rendered object data structures from a plurality of data streams. In embodiments, each data stream retrieved from one of a plurality of data sources. For each device rendered object data structure of the plurality of device rendered object data structures one or more digital content objects contained in the device rendered object data structure is extracted. For each associated digital content object, one or more device rendered object attributes, one or more device rendered object interaction currency value, and one or more device rendered object interaction timestamps are extracted. One or more of the device rendered object attributes, device rendered object interaction currency values, and one or more device rendered object timestamps are appended to a digital content object data structure associated with the digital content object. A machine learning model is used to define a plurality of digital content object clusters. In embodiments, each digital content object cluster is defined based upon similarities identified by the machine learning model.

In embodiments, upon determining that an average digital content object interaction currency value associated with a digital content object cluster exceeds an average digital content object interaction currency value associated with a digital content object superset, an electronic bid adjustment rule is generated to be applied to each existing electronic bid value for each digital content object of the digital content object cluster. In embodiments, the term "exceeds" refers to a significant deviation (in either direction) from the average digital content object interaction currency value.

In embodiments, upon determining that an average digital content object interaction currency value associated with a digital content object cluster is far below an average digital content object interaction currency value associated with a digital content object superset, an electronic bid adjustment rule is generated to be applied to each existing electronic bid value for each digital content object of the digital content object cluster.

An electronic bid value for a digital content object submitted to a third party content provider can have a dramatic impact on a lifetime of the digital content object and/or any associated or related device rendered objects. Basing the generation of electronic bid values purely on a digital content object basis, without utilizing additional attributes associated with device rendered objects the digital content objects may be associated with, results in inappropriate electronic bid values and therefore mismanagement of resources dedicated to the storage and management of device rendered objects and transactions therewith.

There is a multitude of data upon which electronic bid values may be generated, however, the inventors have identified that the system resources and time allocated to such electronic bid value generations are easily exhausted, compromised, or inefficiently applied as a result of an overwhelming amount of data and traditional static generation rules. The inventors have determined that the ability to predictively and dynamically generate a bidding rule for an electronic bid value for a digital content object, using a machine-learning model and based upon historical data known about device rendered objects and their associated attributes, would reduce the computing resources and time necessary to perform such electronic bid value generations and improve the accuracy with which electronic bid values are determined.

Further, there is a lack of inclusion of certain data among the multitude of data upon which electronic bid values may be generated (i.e., the multitude of data, in examples, merely comprising a simple historical analysis of digital content objects performance). The inventors have identified that the ability to include additional information in bid generation provides for more accuracy which results in more efficient use of computing resources.

Finally, embodiments of the present disclosure enable modification of bidding rules based on a difference between accesses by mobile computing devices or desktop computing devices.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer to, without limitation, to a client, customer, purchaser, shopper, user and the like who may be using a client device to receive and interact with a device rendered object.

The term "client profile" refers to a collection of preferences, settings, configurations, client device identifiers, data, and information associated with a specific user. A profile refers therefore to the explicit digital representation of a person's identity and other data or information associated with the user. In some embodiments, a client profile can be used to store a description of characteristics of the user and/or of the client device, as well as credentials, past behaviors, and preferences of the user.

The term "search query" refers to a query for electronic documents or digital content items submitted to a platform by a user utilizing a client device. The term "search results" refers to results returned from such a query. In some examples, a user using the client device may submit a query for "Japanese food" into an interface and the system may return a list of device rendered objects and/or URLs having keywords, metadata, or the like contained therein or associated therewith. The search results thus include the returned list of device rendered objects, all keywords and metadata associated therewith, and an arrangement or ranked order of the returned list.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. The one or more attributes may comprise a "device rendered object attribute set." It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional (e.g., device rendered object) transaction. For example, device rendered object transactions completed by providers from different locations (e.g., different countries, states, neighborhoods or the like) may be associated with different attribute data. For example, different countries have different credit reporting rules and agencies. Thus, a device rendered object service may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model or algorithm. It should be understood that the selection of attributes or clusters of attributes for training machine learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

In embodiments, a machine learning algorithm may use information gain of each attribute to generate a decision tree where each node represents an attribute of the model. In such embodiments, the decision tree is grown or expanded until one or more clusters or digital content objects shows an average electronic currency value far outside an average, and then the set of parent nodes is used to generate the scopes for the bidding rule.

In embodiments, a machine learning algorithm uses K-means, SVM, or similar to compute sets of attributes where the digital content objects to which they apply perform similarly to within a certain margin and then defining bidding rules such that the clusters can be targeted.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

In the present embodiments, digital content objects may have associated therewith one or more attributes. The one or more attributes may comprise a digital content object attribute set. It should be understood that each of the attributes discussed in this application, may be in some embodiments a primary or a secondary attribute. A list of exemplary attributes is provided above.

The term "keyword" refers to a search term, word, or phrase that are selected to be rendered as part of a search engine results interface displayed on a graphical user interface of a client device. Content related to the search terms, words, or phrases are rendered for display to a user using a client device whenever the user enters the keyword into a search engine interface (e.g. Google, Bing, Yahoo, Baidu, and the like) via the client device. The keyword may describe or be associated with device rendered objects provided by a device rendered object service. The keyword may be selected by the device rendered object service as a "digital content object" for which to submit an electronic bid value for search engine marketing to help determine when and where content provided by the device rendered object service may appear on a search engine results page displayed on a graphical user interface for a user using a client device.

It will be appreciated that a keyword may not refer to, and is distinguished from, a search query. In embodiments, a keyword is defined as a discrete object of interest for which advertisements (i.e., content) may be presented. Each keyword defined can be entered into an auction for a given search query based on how closely that keyword matches the search query entered by the user. These are usually referred to in the industry in order of closeness as exact, phrase, and broad, where exact means the keyword=search query and broad means the keyword is somewhat related to the search query. The systems can bid on each of these match types independently and they provide an additional feature for the present classification algorithms.

The term "electronic bid value" refers to a digital representation of an amount of currency a device rendered object service is willing to have deducted from a currency account for a keyword each time a user searches the keyword as described above and interacts, via a client device, with content provided by the device rendered object service that is associated with the keyword. In embodiments, the digital content provided by the device rendered object service is an electronic advertisement. In embodiments, the electronic advertisement is for one or more device rendered objects.

The term "electronic bid value generation rule" refers to a set of logic that, when satisfied, results in an electronic bid value being generated for a particular digital content object or plurality of digital content objects. The logic, in some embodiments, may comprise a combination of attributes selected by a machine learning model that are associated with a cluster of digital content objects, the machine learning model clustering the digital content objects based on historical and real-time data associated therewith. In examples, the electronic bid value generation rule may be used to generate electronic bid values for digital content objects associated with various platforms (e.g., Facebook®, Instagram®, YouTube®, Criteo®, Google® Affiliate Network, and the like). In embodiments, the electronic bid value generation rule may be used to define types of behaviors of clusters of digital content objects such as bidding differently on different classes of devices (e.g., mobile devices or desktop devices) or removing digital content objects from bidding entirely.

The term "digital content object interaction" refers to electronic interaction with a digital content object by a client device. In some examples, the digital content object interaction may take the form of an accessing or selection of the digital content object, and/or the like.

In some embodiments, the interaction data may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

It should be appreciated that the term "programmatically expected" indicates machine prediction of occurrence of certain events. For example, a "programmatically expected" number of device rendered object interactions by a first user associated with a client device is a number determined by machine prediction specifying the expected number of device rendered object interactions that will be performed by the first user associated with the client device.

As used herein, the term "likelihood" refers to a measure of probability for occurrence of a particular event. For example, the likelihood that a client device will interact with a device rendered object may be a value associated with a specific scale. In some implementations, the machine predictions discussed above are based, at least in part, on the "likelihood" that an event will occur.

The term "related device rendered objects" refers to device rendered objects that are considered related based on common attributes, divisions, geolocations, historical device rendered object interaction currency values, and the like.

The term "device rendered object repository" refers to a storage medium or database containing a plurality of device rendered objects.

The term "digital content object set" refers to a plurality of digital content objects grouped into a set.

The term "related digital content objects" refers to a plurality of related digital content objects.

The term "related digital content object set" refers to a plurality of related digital content objects grouped into a set.

The term "historical" refers to data collected over a duration of network time leading up to a present network time.

The term "device rendered object interaction currency value" refers to a currency value associated with any time a client device interacts with a device rendered object. As an example, a device rendered object may have associated therewith an interaction currency value (e.g., revenue per click).

The term "digital content object interaction currency value" refers to a currency value associated with any time a client device interacts with a digital content object. As an example, a digital content object (e.g., a keyword) may have associated therewith an interaction currency value (e.g., revenue per click).

The terms "machine learning model" and "machine learning algorithm" refer to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a regression model.

The term "digital content object campaign type" refers to an electronic display campaign type associated with a digital content object. For example, a digital content object (e.g., a keyword) may be associated with a campaign type (e.g., deal, coupon, discount, root, voucher). Further examples of campaign types include manually generated digital connect objects, digital content objects purchased from third parties, offer related digital content objects, discount related digital content objects, digital content objects containing specific brand or other terms, and dynamic search advertisement digital content objects (where an advertisement has a search query inserted automatically).

The term "digital content object division size" refers to a size of a division associated with an digital content object. In some examples, a division size can be one of small, medium, or large. In embodiments, a one-to-one relationship may be drawn or established between large geographic cities/areas and divisions. Further, a device rendered object and a user may each be associated with a division.

The term "digital content object geolocation" refers to a physical location associated with a digital content object. In some examples, a digital content object (e.g., a keyword) can be associated with a geolocation (e.g., Chicago).

The term "digital content object match type" refers to the type of matching intended for a digital content object interaction. In examples, a type of matching can be broad, at a phrase level, or at an exact level.

The term "electronic marketing auction" refers to an electronic auction whereby a third party content provider allows for providers such as a device rendered object service to identify digital content objects for which they will transfer a currency value to the third party content provider. When a client device interacts with the third party content provider, the third party content provider reviews the pool of currency value offers for digital content objects deemed relevant to the interaction and enables an electronic auction such that a winning electronic bid value results in content being displayed for the client device to interact with.

The term "digital content object data structure" refers to a data structure having a plurality of data fields each of which is associated with a particular digital content object.

The term "device rendered object data structure" refers to a data structure having a plurality of data fields each of which is associated with a particular device rendered object.

The term "digital content object superset" refers to a plurality of digital content objects, all of which are known to a device rendered object service.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
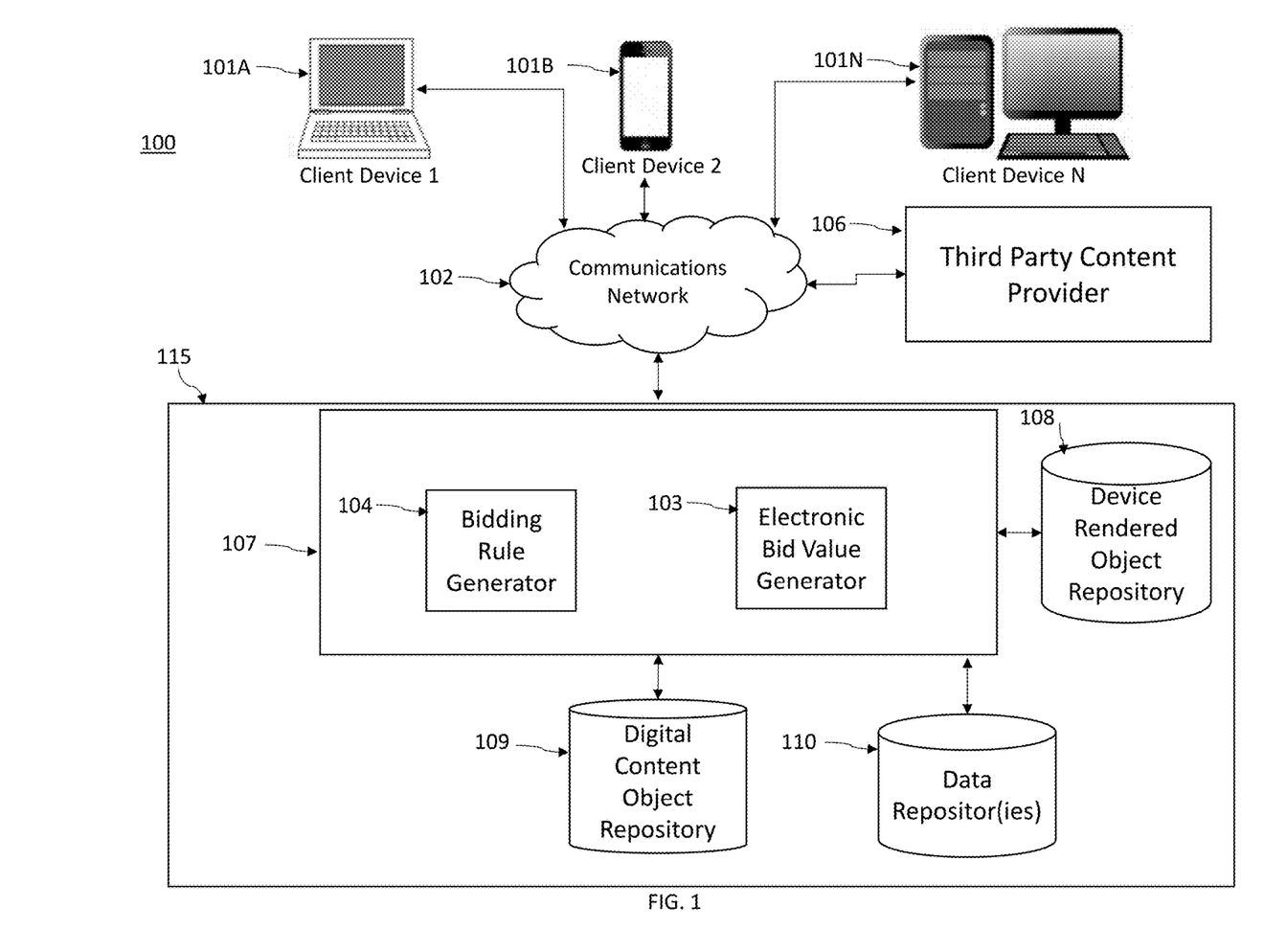
FIG. 1 is a system architecture diagram of a system configured to practice embodiments of the present disclosure.

FIG. 1 illustrates an example computing system within which embodiments of the present disclosure may operate. Client devices may access a device rendered object system 115 via a communications network 104 (e.g., the Internet, LAN, WAN, or the like) using client devices 101A-101N. The device rendered object system 115 may comprise a server 107 in communication with one or more databases or repositories 108, 109, 110. The device rendered object system 115 and the client devices 101A-101N may also access and/or communicate with a third party content provider 106 via communications network 104.

The server 107 may be embodied as a computer or computers as known in the art. The server 107 may provide for receiving of electronic data from various sources, including but not necessarily limited to the client devices 101A-101N. For example, the server 107 may be operable to receive and process device rendered object requests and transactions provided by the client devices 101A-101N.

The databases or repositories 108-111 may be embodied as a data storage device such as a Network Attached Storage (NAS) device or devices, or as a separate database server or servers. The databases 108-111 include information accessed and stored by the server 107 to facilitate the operations of the device rendered object system 115. For example, the databases 108-111 may include, without limitation, client profiles for users of the device rendered object system 115, traffic data, digital content objects and associated features/attributes, device rendered objects and associated features/attributes, and the like.

The server 107 may comprise a bidding rule generator 104 that is configured to generate bidding rules for adjusting electronic bid values that may be generated by an electronic bid value generator 103 for generating electronic bid values for digital content objects.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the device rendered object system 115. Such apps are typically designed to execute on mobile devices, such as tablets or smartphones. For example, an app may be provided that executes on mobile device operating systems such as iOS®, Android®, or Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the device rendered object system 115 and/or the third party content provider 106 via a web browser. As yet another example, the client device 101A-101N may include various hardware or firmware designed to interface with the device rendered object system 115 and/or the third party content provider 106.

Example Apparatus for Implementing Embodiments of the Present Disclosure

Figure 2:
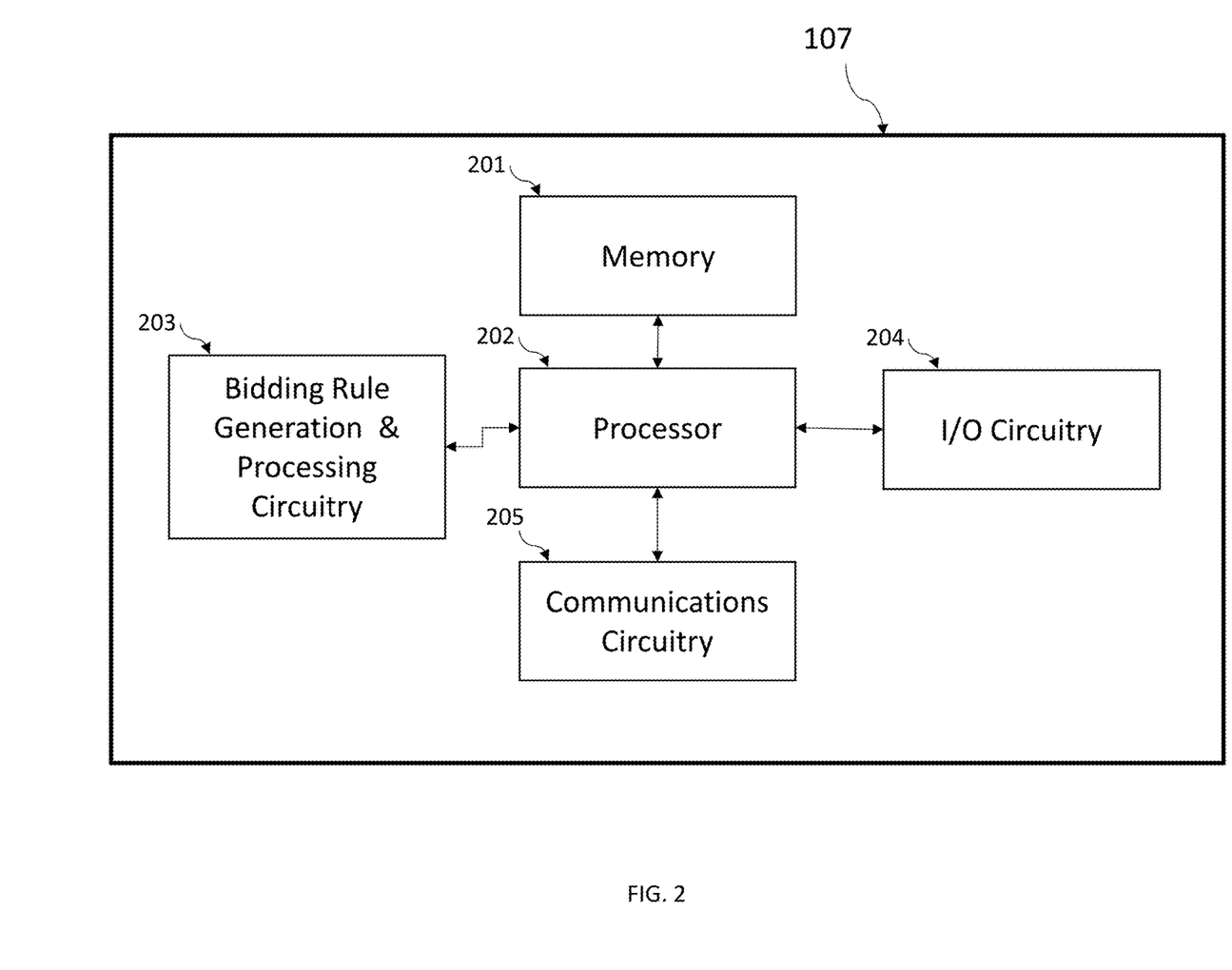
FIG. 2 is an exemplary schematic diagram of a computing entity according to one embodiment of the present disclosure.

The server 107 may be embodied by one or more computing systems, such as apparatus 200 shown in FIG. 2. The apparatus 200 may include a processor 202, a memory 201, input/output circuitry 204, communications circuitry 205, and bidding rule generation and processing circuitry 203. The apparatus 200 may be configured to execute the operations described herein. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Bidding rule generation and processing 203 includes hardware configured to generate bidding rules for electronic bid values for digital content objects. The bidding rule generation and processing circuitry 203 may utilize processing circuitry, such as the processor 202, to perform these actions. It should also be appreciated that, in some embodiments, the bidding rule generation and processing circuitry 203 may include a separate processor, specially configured field programmable gate array (FPGA), or application specific interface circuit (ASIC). The bidding rule generation and processing circuitry 203 may be implemented using hardware components of the apparatus configured by either hardware or software for implementing the functions described herein.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Predictive Dynamic Generation of Bidding Rules for Digital Content Objects Embodiments of the present disclosure leverage large scale data to optimize electronic bid values for digital content objects by aggregating metadata and performance data of individual device rendered objects and related device rendered objects dynamically. This includes aggregating static device rendered object metadata (e.g., location, category, subcategory, merchant, price), dynamic device rendered object data (e.g., device rendered object transaction currency value velocity, year over year performance) and device rendered object campaign data (e.g., digital content object interactions, digital content object interaction currency values, digital content object interactions that resulted in device rendered object transactions, as well as digital content object match type, digital content object length, and the like). Embodiments of the present disclosure then search across these various dimensions in an automated fashion to define clusters of digital content objects that appear to present similar performance characteristics. Embodiments of the present disclosure further generate adjusted electronic bid values for clusters of digital content objects meeting certain criteria (i.e., bidding rules).

According to embodiments, not all attributes associated with a device rendered object are equally relevant for all digital content objects associated with the device rendered object (or all digital content objects associated with the attributes). According to embodiments, the relevance of attributes associated with a device rendered object may change over time. Accordingly, the clusters of digital content objects and the adjusted electronic bid values for clusters of digital content objects meeting certain criteria (i.e., bidding rules) may be continuously recalculated as client devices continue to interact with the device rendered object service (e.g., by interacting with digital content objects and/or device rendered objects).

Figure 3:
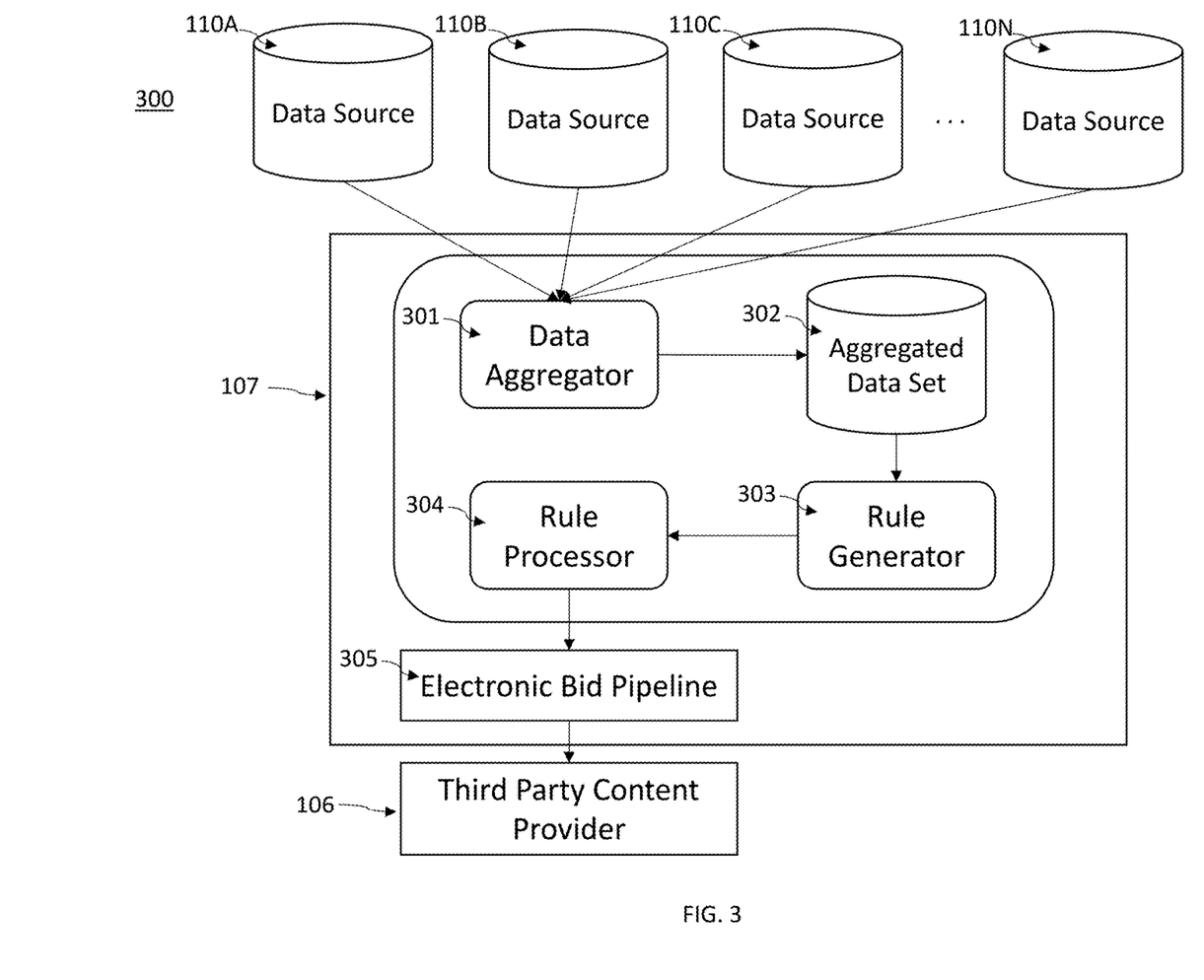
FIG. 3 illustrates an exemplary bidding rule generation system for use with embodiments of the present disclosure.

FIG. 3 illustrates an exemplary bidding rule generation system for use with embodiments of the present disclosure. According to embodiments, server 107 receives data streams from a plurality of data sources 110A-110N. For example, a data source of the plurality of data sources 110A-110N may comprise a device rendered object attributes repository, a device rendered object transactions repository, and a digital content object interaction repository.

According to embodiments, server 107 comprises a data aggregator module 301 configured to aggregate the data streams received from the plurality of data sources 110A-110N. The data streams are aggregated into an aggregated data set 302 across multiple data sets on a per digital content object basis. Aggregating the aggregated data set on a per digital content object basis ensures that all attributes related to a digital content object can be accessed easily. Examples of attributes, according to embodiments, include: category, subcategory, sub-sub-category, merchant, location, number of device rendered object transactions, number of device rendered object interactions, device rendered object rating, rate of device rendered object transactions, electronic currency value, digital content object match type (broad, exact, phrase), digital content object interactions, day of week, length of digital content object, and the like.

According to embodiments, server 107 further comprises a rule generator module 303 configured to determine which clusters of digital content objects present similar performance (e.g., digital content object interaction currency value) for any given set of device rendered object attributes. In embodiments, digital content objects are aggregated according to various attributes and their relative performance (i.e., electronic currency values) are compared. Digital content objects performing similarly define a cluster, where it can be assumed that other new digital content objects sharing the attributes will eventually exhibit similar performance. These clusters are defined using the same notation as defined on the left hand side of rule (1) below. According to embodiments, the clusters can be computed using a brute force type search, with every single combination tried until a working high performing or low performing combination is found. According to embodiments, a machine learning model is applied to define the clusters (e.g., classification algorithm).

According to embodiments, server 107 further comprises a rule processing module 304 configured to programmatically generate adjustments to electronic bid values for groups of digital content objects meeting certain criteria (i.e., bidding rules). According to embodiments, the rule processing module 304 produces a target electronic bid value modifier (i.e., adjustment) based on each individually computed rule. This is achieved by comparing the average performance of a cluster in terms of digital content object interaction currency value (i.e., revenue per click) against overall performance.

According to embodiments, server 107 applies adjustments to established electronic bid values in an electronic bid pipeline 305 and pushes the adjusted electronic bid values to appropriate third party content providers 106.

In embodiments, an example bidding rule (or bid adjustment) may be represented as follows:

$$[\text{category="Gardening" and site\_purchases>200}] \Rightarrow >1.5 \quad (1)$$

On the left hand side of rule (1) are criteria that can be used for selecting applicable digital content objects. For example, all digital content objects for device rendered objects having a category of "gardening" and where there are over 200 device rendered object transactions (e.g., purchases) through the device rendered object services are selected. These selected digital content objects receive an electronic bid value adjustment of 1.5 (i.e., a boost of 50%).

It will be appreciated that the process depicted in FIG. 3 may be continuously run and re-run multiple times during a network time period (e.g., multiple times per hour, per day, etc) to guarantee freshness of dynamic data and leverage changes.

Figure 4A:
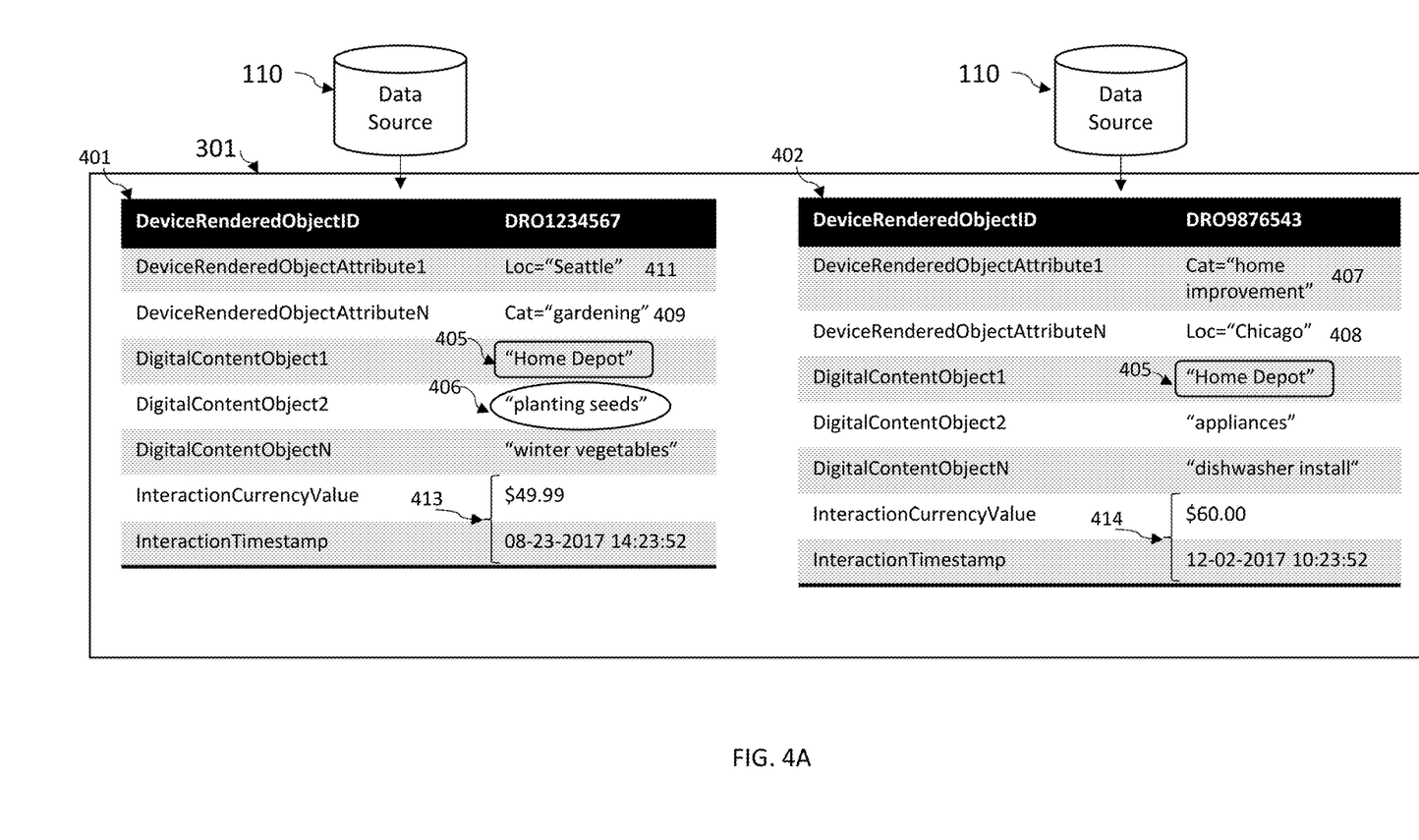
FIG. 4A illustrates an exemplary process for digital content object data aggregation for use with embodiments of the present disclosure.
Figure 4B:
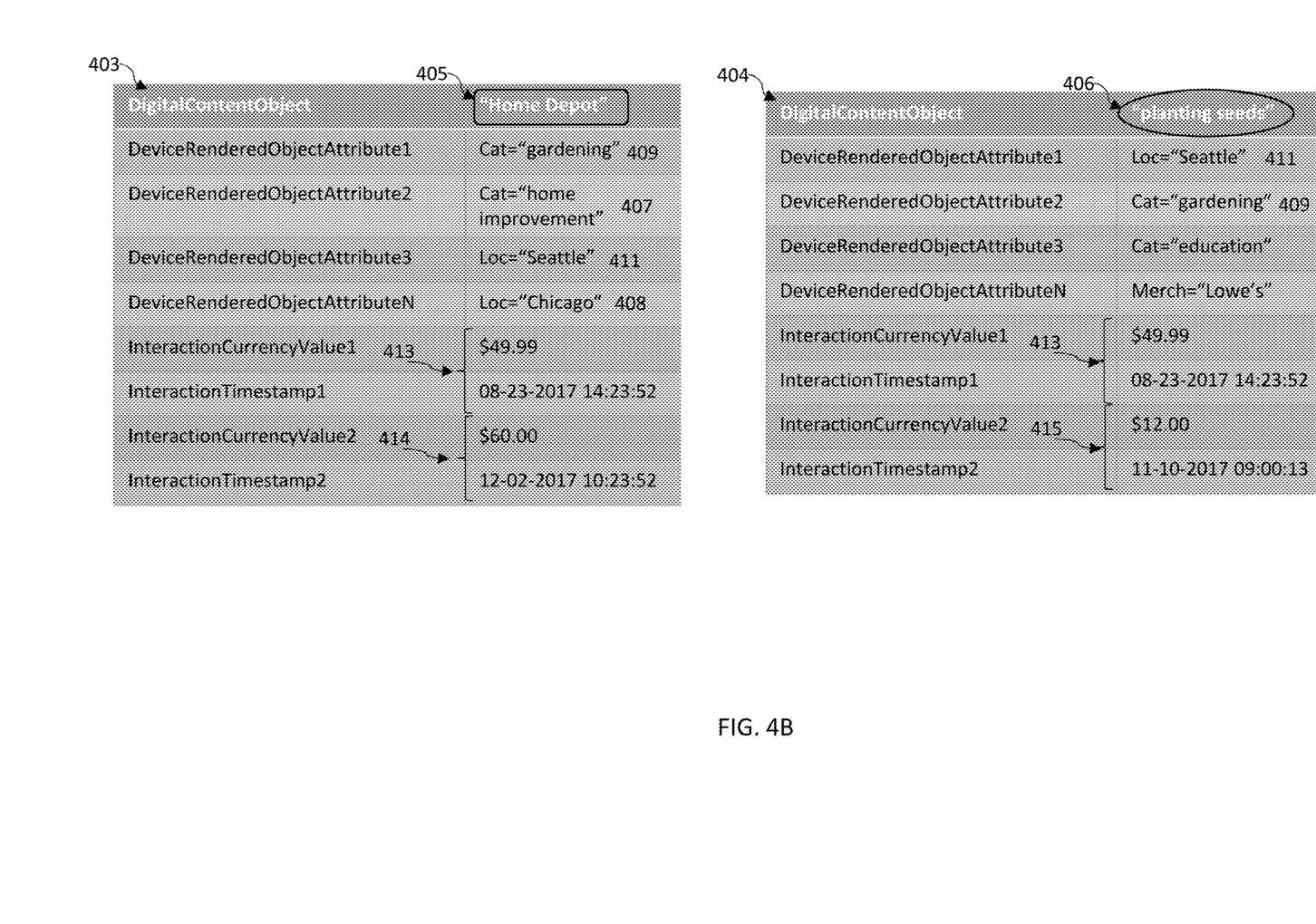
FIG. 4B illustrates an exemplary process for digital content object data aggregation for use with embodiments of the present disclosure.

FIGS. 4A and 4B illustrate an exemplary process for digital content object data aggregation for use with embodiments of the present disclosure.

In embodiments, a data aggregator 301 receives device rendered object interaction data structures 401, 402 from one or multiple data sources 110. It will be appreciated that the data aggregator 301 may receive a plurality of device rendered object interaction data structures or other data structures from any number of data sources.

In the example depicted in FIG. 4, an exemplary first device rendered object interaction structure 401 is related to an exemplary interaction with a device rendered object having a DeviceRenderedObjectID of "DRO1234567." The exemplary interaction with "DRO1234567" occurred at 14:23:52 on Aug. 23, 2017, and had a transaction or interaction currency value of $49.99 as indicated by the exemplary InteractionTimestamp and InteractionCurrencyValue fields 413 of exemplary data structure 401. "DRO1234567" has associated therewith a plurality of device rendered object attributes, examples of which include: a location of "Seattle" 411 as indicated by the value in exemplary DeviceRenderedObjectAttribute1 field of exemplary data structure 401; a category of "gardening" 409 as indicated by the value in exemplary DeviceRenderedObjectAttributeN field of exemplary data structure 401. "DRO1234567" has associated therewith a plurality of digital content objects, examples of which include: "Home Depot" (405) as indicated by the value in exemplary DigitalContentObject1 field of exemplary data structure 401; "planting seeds" (406) as indicated by the value in exemplary DigitalContentObject2 field of exemplary data structure 401; "winter vegetables" as indicated by the value in exemplary DigitalContentObjectN field of exemplary data structure 401.

In the example depicted in FIG. 4, an exemplary second device rendered object interaction structure 402 is related to an exemplary interaction with a device rendered object having a DeviceRenderedObjectID of "DRO9876543." The exemplary interaction with "DRO9876543" occurred at 10:23:52 on Dec. 2, 2017, and had a transaction or interaction currency value of $60.00 as indicated by the exemplary InteractionTimestamp and InteractionCurrencyValue fields 414 of exemplary data structure 402. "DRO9876543" has associated therewith a plurality of device rendered object attributes, examples of which include: a location of "Chicago" 408 as indicated by the value in exemplary DeviceRenderedObjectAttributeN field of exemplary data structure 402; a category of "home improvement" 407 as indicated by the value in exemplary DeviceRenderedObjectAttribute1 field of exemplary data structure 402. "DRO9876543" has associated therewith a plurality of digital content objects, examples of which include: "Home Depot" (405) as indicated by the value in exemplary DigitalContentObject1 field of exemplary data structure 402; "appliances" as indicated by the value in exemplary DigitalContentObject2 field of exemplary data structure 402; "dishwasher install" as indicated by the value in exemplary DigitalContentObjectN field of exemplary data structure 402.

It will be appreciated that the structure and contents of exemplary data structures 401 and 402 are for illustrative purposes only, and that any number of device rendered object attributes, digital content objects, interaction currency values, timestamps, and other items of data pertinent to the present disclosure may be associated with digital content objects, device rendered objects, or interactions therewith without departing from the scope herein.

Data aggregator 301 extracts the records from the device rendered object interaction data structures 401, 402 so that digital content object data structures 403, 404 can be generated or updated as shown in FIG. 4B.

Turning to FIG. 4B, for example, an exemplary digital content object data structure 403 may be associated with a digital content object "Home Depot" (405). The exemplary digital content object data structure 403 comprises a plurality of fields, including exemplary device rendered object attributes with which the digital content object is associated. Examples of device rendered object attributes, according to the example in FIG. 4B, may include a category of "gardening" 409 as depicted in DeviceRenderedObjectAttribute1 field of exemplary data structure 403 and a location of "Seattle" 411 as depicted in DeviceRenderedObjectAttribute3 field of exemplary data structure 403. It will be appreciated that the category of "gardening" 409 and the location of "Seattle" 411 may be associated with the digital content object "Home Depot" as a result of the interaction represented by exemplary data structure 401 (the connections are depicted as 411, 409 in both FIGS. 4A and 4B).

Further examples of device rendered object attributes, according to the example in FIG. 4B, may include a category of "home improvement" 407 as depicted in DeviceRenderedObjectAttribute2 field of exemplary data structure 403 and a location of "Chicago" 408 as depicted in DeviceRenderedObjectAttributeN field of exemplary data structure 403. It will be appreciated that the category of "home improve-ment" and the location of "Chicago" may be associated with the digital content object "Home Depot" as a result of the interaction represented by exemplary data structure 402 (the connections are depicted in both FIGS. 4A and 4B as 407, 408).

Examples of interaction currency values and interaction timestamps are reflected in the fields identified as 413 and 414 of exemplary data structure 403, which may also have resulted from the interactions depicted in exemplary data structures 401, 402.

By way of further example, an exemplary digital content object data structure 404 may be associated with a digital content object "planting seeds" (406). The exemplary digital content object data structure 404 comprises a plurality of fields, including exemplary device rendered object attributes with which the digital content object is associated. Examples of device rendered object attributes, according to the example in FIG. 4, may include a category of "gardening" 409 as depicted in DeviceRenderedObjectAttribute2 field of exemplary data structure 404 and a location of "Seattle" 411 as depicted in DeviceRenderedObjectAttribute1 field of exemplary data structure 404. It will be appreciated that the category of "gardening" and the location of "Seattle" may be associated with the digital content object "planting seeds" as a result of the interaction represented by exemplary data structure 401 (the connections are depicted in both FIGS. 4A and 4B as 411 and 409).

Further examples of device rendered object attributes, according to the example in FIG. 4B, may include a category of "education" as depicted in DeviceRenderedObjectAttribute3 field of exemplary data structure 404 and a merchant of "Lowe's" as depicted in DeviceRenderedObjectAttributeN field of exemplary data structure 404.

Examples of interaction currency values and interaction timestamps are reflected in the fields identified as 413 and 415 of exemplary data structure 404. It will be appreciated that the values in fields 413 may also have resulted from the interactions depicted in exemplary data structure 401.

It will be appreciated that, in view of the process 400 depicted in FIG. 4, data structures representing interactions with device rendered objects may contain or be associated with a multitude of data that can be extracted and aggregated on a per-digital content object basis. The resulting per-digital content object aggregated data set can be used by a predictive model to determine digital content object clusters for use in determining adjustments to electronic bid values for various digital content objects.

Figure 5:
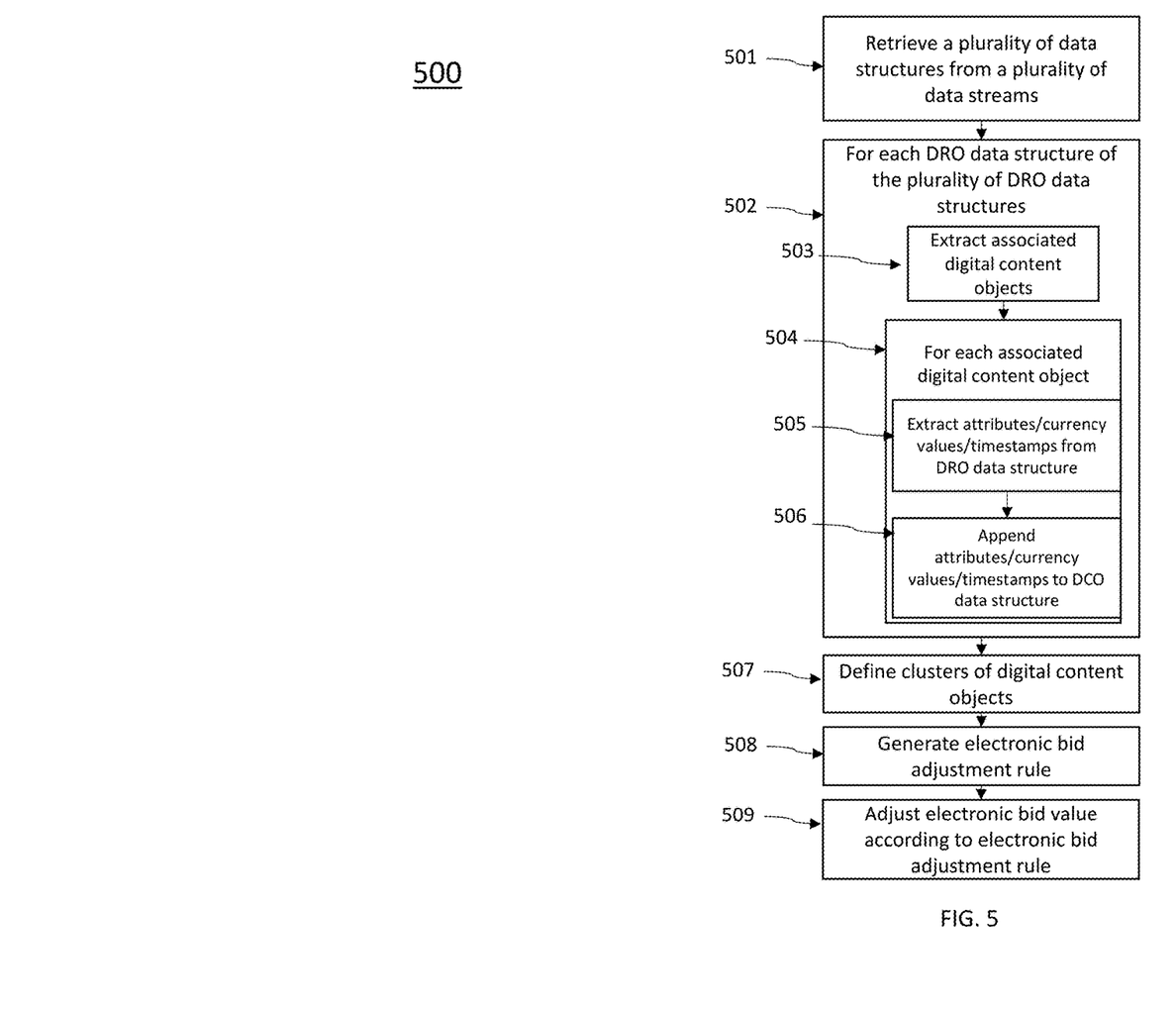
FIG. 5 illustrates an exemplary process for predictive dynamic bidding rule generation for use with embodiments of the present disclosure.

FIG. 5 illustrates an exemplary process for predictive dynamic bidding rule generation for use with embodiments of the present disclosure.

According to embodiments, a process 500 begins with retrieving 501 a plurality of device rendered object data structures from a plurality of data streams In embodiments, each data stream retrieved from one of a plurality of data sources.

In embodiments, for each device rendered object data structure of the plurality of device rendered object data structures 502, process 500 continues with extracting 503 one or more digital content objects contained in the device rendered object data structure.

In embodiments, for each associated digital content object 504, process 500 continues with extracting 505 one or more device rendered object attributes, one or more device rendered object interaction currency value, and one or more device rendered object interaction timestamps.

In embodiments, process 500 continues with appending 506 one or more of the device rendered object attributes, device rendered object interaction currency values, and one or more device rendered object timestamps to a digital content object data structure associated with the digital content object.

In embodiments, process 500 continues with defining 507, using a machine learning model, a plurality of digital content object clusters. In embodiments, each digital content object cluster is defined based upon similarities identified by the machine learning model.

In embodiments, machine learning models for use with embodiments disclosed herein may include descending a decision tree using maximum information gain until a threshold of significance is reached, and a set of parent nodes of the decision tree is used to generate the electronic bid rule. In embodiments, machine learning models for use with embodiments disclosed herein include using K-means, SVM, or similar clustering algorithms to compute similarly performing clusters of digital content objects.

In embodiments, process 500 continues with, upon determining that an average digital content object interaction currency value associated with a digital content object cluster exceeds an average digital content object interaction currency value associated with a digital content object superset, generating 508 an electronic bid adjustment rule to be applied to each existing electronic bid value for each digital content object of the digital content object cluster.

In embodiments, process 500 continues with adjusting 509 the existing electronic bid value for each digital content object of the digital content object cluster based on the electronic bid adjustment rule.

In embodiments, the plurality of data sources comprises one or more of a device rendered object attributes repository, a device rendered object transactions repository, and a digital content object interaction repository.

In embodiments, the average digital content object interaction currency value is calculated based upon historical digital content object interaction currency values associated with each digital content object of the related digital content object cluster.

In embodiments, a digital content object is a keyword.

In embodiments, the plurality of digital content object clusters is continuously updated based on data streams received in real-time.

In embodiments, the machine learning model is based on classification algorithm.

In embodiments, the electronic bid value is for transmitting to a third party content provider for use in an electronic digital content auction.

In embodiments, the device rendered object data structure comprises one or more device rendered object attributes, one or more associated digital content objects, and one or more device rendered object interaction currency values.

In embodiments, the digital content object data structure comprises one or more device rendered object attributes, one or more device rendered object interaction currency values, and one or more device rendered object interaction timestamps.

In embodiments, the digital content objects superset comprises all digital content objects known to a device rendered object service.

In embodiments, the electronic bid adjustment rule comprises one or more device rendered object attributes and one or more device rendered object interaction currency values.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
- for each device rendered object data structure of a plurality of device rendered object data structures associated with a plurality of device rendered object transactions, extract one or more digital content objects from the device rendered object data structure;
- aggregate the one or more digital content objects on a per digital content object basis into an aggregated dataset based at least in part on aggregation of the one or more digital content objects associated with each of the plurality of device rendered object transactions;
- for each digital content object of the aggregated dataset, append one or more device rendered object attributes to a digital content object data structure associated with the digital content object;
- generate, using a machine learning model, a plurality of digital content object clusters, wherein each digital content object cluster is defined based at least in part similarities identified by the machine learning model;
- responsive to determining that an average digital content object interaction currency value associated with a digital content object cluster exceeds an average digital content object interaction currency value associated with a digital content object superset, generate an electronic bid adjustment rule to be applied to each existing electronic bid value for each digital content object of the digital content object cluster; and
- adjust the existing electronic bid value for each digital content object of the digital content object cluster based at least in part on the electronic bid adjustment rule.

2. The apparatus of claim 1, wherein the at least one memory and the computer program code configured to, with the at least one processor, further cause the apparatus to:
retrieve the plurality of device rendered object data structures from a plurality of data streams.

3. The apparatus of claim 2, wherein each data stream is retrieved from one of a plurality of data sources.

4. The apparatus of claim 3, wherein the plurality of data sources comprises one or more of a device rendered object attributes repository, a device rendered object transactions repository, and a digital content object interaction repository.

5. The apparatus of claim 1, wherein the at least one memory and the computer program code configured to, with the at least one processor, further cause the apparatus to:
extract one or more of the one or more device rendered object attributes, one or more device rendered object interaction currency value, or one or more device rendered object interaction timestamps from the device rendered object data structure.

6. The apparatus of claim 5, wherein the at least one memory and the computer program code configured to, with the at least one processor, further cause the apparatus to:
append one or more of the one or more device rendered object interaction currency values or one or more device rendered object timestamps to the digital content object data structure associated with the digital content object.

7. The apparatus of claim 1, wherein a digital content object comprises a keyword.

8. The apparatus of claim 1, wherein the plurality of digital content object clusters is continuously updated based at least in part on data streams received in real-time.

9. The apparatus of claim 1, wherein the machine learning model is based at least in part on one of a classification algorithm, a clustering algorithm, or a decision tree.

10. The apparatus of claim 1, wherein the electronic bid adjustment rule comprises one or more device rendered object attributes and one or more device rendered object interaction currency values.

11. A computer-implemented method, comprising:
- for each device rendered object data structure of a plurality of device rendered object data structures associated with a plurality of device rendered object transactions, extracting one or more digital content objects from the device rendered object data structure;
- aggregating the one or more digital content objects on a per digital content object basis into an aggregated dataset based at least in part on aggregation of the one or more digital content objects associated with each of the plurality of device rendered object transactions;
- for each digital content object of the aggregated dataset, appending one or more device rendered object attributes to a digital content object data structure associated with the digital content object;
- generating, using a machine learning model, a plurality of digital content object clusters, wherein each digital content object cluster is defined based at least in part similarities identified by the machine learning model;
- responsive to determining that an average digital content object interaction currency value associated with a digital content object cluster exceeds an average digital content object interaction currency value associated with a digital content object superset, generating an electronic bid adjustment rule to be applied to each existing electronic bid value for each digital content object of the digital content object cluster; and
- adjusting the existing electronic bid value for each digital content object of the digital content object cluster based at least in part on the electronic bid adjustment rule.

12. A computer program product comprising at least one non-transitory storage media for storing instructions that, when executed by the one or more processors, cause an apparatus to:
- for each device rendered object data structure of a plurality of device rendered object data structures associated with a plurality of device rendered object transactions, extract one or more digital content objects from the device rendered object data structure;
- aggregate the one or more digital content objects on a per digital content object basis into an aggregated dataset based at least in part on aggregation of the one or more digital content objects associated with each of the plurality of device rendered object transactions;
- for each digital content object of the aggregated dataset, append one or more device rendered object attributes to a digital content object data structure associated with the digital content object;
- generate, using a machine learning model, a plurality of digital content object clusters, wherein each digital content object cluster is defined based at least in part similarities identified by the machine learning model;
- responsive to determining that an average digital content object interaction currency value associated with a digital content object cluster exceeds an average digital content object interaction currency value associated with a digital content object superset, generate an electronic bid adjustment rule to be applied to each existing electronic bid value for each digital content object of the digital content object cluster; and
- adjust the existing electronic bid value for each digital content object of the digital content object cluster based at least in part on the electronic bid adjustment rule.

13. The computer program product of claim 12, wherein the at least one non-transitory storage media stores instructions that, when executed by the one or more processors, further cause the apparatus to:
   retrieve the plurality of device rendered object data structures from a plurality of data streams.

14. The apparatus of claim 13, wherein each data stream is retrieved from one of a plurality of data sources.

15. The computer program product of claim 14, wherein the plurality of data sources comprises one or more of a device rendered object attributes repository, a device rendered object transactions repository, and a digital content object interaction repository.

16. The computer program product of claim 12, wherein the at least one non-transitory storage media stores instructions that, when executed by the one or more processors, further cause the apparatus to:
   extract one or more of the one or more device rendered object attributes, one or more device rendered object interaction currency value, or one or more device rendered object interaction timestamps from the device rendered object data structure.

17. The computer program product of claim 12, wherein the at least one non-transitory storage media stores instructions that, when executed by the one or more processors, further cause the apparatus to:
   append one or more of the one or more device rendered object interaction currency values or one or more device rendered object timestamps to the digital content object data structure associated with the digital content object.

18. The computer program product of claim 12, wherein a digital content object comprises a keyword.

19. The computer program product of claim 12, wherein the plurality of digital content object clusters is continuously updated based at least in part on data streams received in real-time.

20. The computer program product of claim 12, wherein the machine learning model is based at least in part on one of a classification algorithm, a clustering algorithm, or a decision tree.

* * * * *